April 12, 1966    T. R. HERNDON ETAL    3,246,127
TIMING CIRCUIT UTILIZING A MECHANICAL COUNTER
Filed Oct. 4, 1962
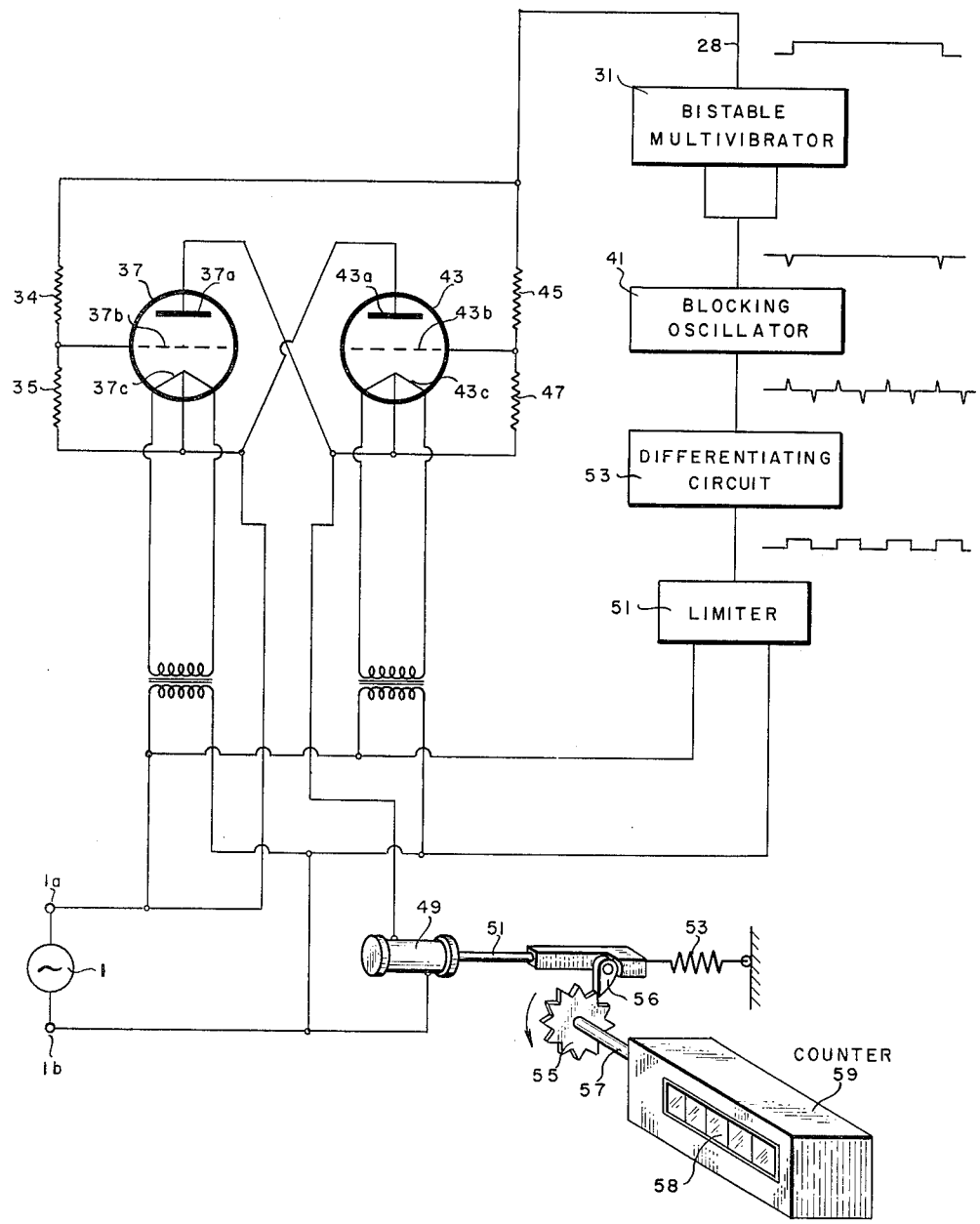
INVENTORS.
THOMAS R. HERNDON,
OTTO P. MULLINS,
CECIL J.V. NEWTON,
BY John B. Davidson
ATTORNEY

United States Patent Office 3,246,127
Patented Apr. 12, 1966

3,246,127
TIMING CIRCUIT UTILIZING A MECHANICAL COUNTER
Thomas R. Herndon, Otto P. Mullins, and Cecil J. V. Newton, Baytown, Tex., assignors, by mesne assignments, to Esso Research and Engineering Company, Elizabeth, N.J., a corporation of Delaware
Filed Oct. 4, 1962, Ser. No. 228,363
2 Claims. (Cl. 235—92)

This invention relates to apparatus for actuating a mechanical counter, and more particularly to apparatus for utilizing a frequency-regulated, alternating current source for actuating such a mechanical counter.

In connection with many analytical techniques, there exists a need for accurately measuring time intervals to at least 1/10 of a second accuracy. Preferably, the time measuring means should be exceedingly simple as well as accurate to minimize cost as well as to minimize maintenance problems. A particularly desirable device to use in connection with time measurement is a mechanical counter making use of a multiplicity of decimal wheels, inasmuch as such a device is quite easy to read, is relatively inexpensive, and is highly accurate. As a time standard it is common practice to use the frequency of alternating current power lines inasmuch as such power frequency is exceedingly accurately regulated. Therefore, it is highly desirable to be able to actuate mechanical counters from an alternating current source.

In accordance with the teachings of the present invention, a shaft driving a decimal wheel of a mechanical counter is repetitively actuated by an electro-magnet having an actuating coil. The electromagnet is connected between a regulated alternating current power source and a pair of thyratrons connected back-to-back (i.e., the cathode of each is connected to the plate electrode of the other) so that when the thyratrons are biased to conduction, the actuating coil will be energized on each half cycle of the power source. The control electrodes of the thyratrons are coupled to a multivibrator having means for adjusting the output of the multivibrator to a pulse repetition rate that is a submultiple of the frequency of the alternating power source. The multivibrator is synchronized with the power source so that the waveform thereof begins at the instant of polarity change from one polarity to another by the power source. Thus, the thyratrons conduct for a given number of cycles of the power source, and with each conduction period, energize the electromagnet actuating coil to actuate the mechanical counter.

Objects and features of the invention not apparent from the above discussion will become evident upon consideration of the following detailed description thereof taken in connection with the accompanying drawing, wherein the single figure is a schematic diagram of a preferred embodiment of the invention.

With reference now to the figure, there is shown a mechanical counter 59 having an actuating shaft 57. The mechanical counter 59 may be any of a number of types of counters wherein a decimal wheel is driven directly from shaft 57 so as to uncover sucessive numerals in a window 58 upon each rotation of the shaft 57 through a predetermined angle (e.g., 36°). The wheel driven by shaft 57 in turn drives additional wheels according to a decimal succession. Such apparatus is well known to the art and is manufactured by a number of companies, such as the Durant Manufacturing Company of Milwaukee, Wisconsin.

In the simplified schematic diagram the mechanical driving shaft 57 is shown as being rotated by means of a ratchet wheel 55 and a ratchet comprising the armature 51 of an electromagnet 49, with a pivoted dog 56 adapted to engage the teeth of the ratchet wheel 55. The armature 51 is shown as being urged to a normal position by a spring 53 such that energization of the actuating coil of electromagnet 49 will pull the armature 51 to the left, thus rotating ratchet wheel 55 and shaft 57 through a predetermined angle. A pair of thyratrons 37 and 43 are connected back-to-back such that plate 37a and the center tap of cathode 37c of thyratron 37 are respectively connected to the center tap of cathode 43c and the plate electrode 43a of thyratron 43. The actuating coil of electromagnet 49 is connected between terminal 1b of frequency regulated alternating current source 1 and the plate 37a and center tap of cathode 43c. The terminal 1a of alternating current source 1 is connected to plate electrode 43a and the center tap of cathode 37c. Thus, in effect, the actuating coil of electromagnet 49 is connected in series with the cathode-plate conduction paths of the thyratrons across the terminals 1a and 1b.

The thyratrons 37 and 43 are activated from a bistable multivibrator 31 having output terminal 28. The thyratrons fire when the plate is positive with respect to the cathode by predetermined low voltage and the control electrode is at a suitable firing voltage relative to the cathode. Output terminal 28 is coupled to control electrode 37b through a voltage divider comprising resistors 34 and 35, and to control electrode 43b through a voltage divider comprising resistors 45 and 47. Resistors 45 and 47 are connected to the center tap of cathodes 37c and 43c, respectively. Control electrode 37b is connected to the juncture of resistors 34, 35 and control electrode 43b is connected to the juncture of resistors 45, 47. The output voltage from multivibrator 31 applied to control electrodes 37a, 43a is of sufficient amplitude to fire the thyratrons when the plate electrodes are at said predetermined low voltage relative to their cathodes.

For the purpose of synchronizing the operation of the multivibrator with the alternating current power source, there is provided a limiter circuit 51 coupled to the power source terminals 1a and 1b for the purpose of producing a substantially rectangular wave output voltage by limiting the wave shape of the alternating current source to a very low value. The output voltage of limiter 51 is thereupon differentiated by differentiating circuit 53 to produce positive and negative pulses at the leading and trailing edges of the output voltage waveform from limiter 51. These pulses are of relatively small amplitude and are applied to a blocking oscillator 41, which is adjusted as closely as possible to a submultiple of the frequency of alternating current source 1. The pulses from differentiator 53 function to trigger blocking oscillator 41 so that the pulse repetition rate of blocking oscillator 41 is precisely a submultiple of the frequency of alternating current source 1. The output pulses from blocking oscillator 41 are applied to the control circuits of bistable multivibrator 31 to produce a rectangular wave output signal at output terminal 28.

The cathodes 37c and 43c of thyratrons 37 and 43 are energized from separate transformers 39 and 48. The primaries of the transformers are connected to terminals 1a and 1b.

In operation, the control elements of blocking oscillator 41 are adjusted so that the pulse repetition rate thereof is as near as possible to a submultiple of the frequency of the alternating current source 1. For example, if the alternating current source 1 is 60 cycles per second, the pulse repetition rate of multivibrator 31 may be 20 pulses per second. On alternate half cycles of the output voltage of multivibrator 31, the thyratrons 37 and 43 will have a voltage placed on the control electrodes thereof sufficient to bias them to conduction so that they conduct on alternate half cycles of the voltage waveform applied to terminals 1a and 1b. On each half cycle of multivibrator 31 over which the thyratrons are conducting, the actuating coil of electromagnet 49 will be activated to pull the armature 51 to the left and rotate shaft 57 through a predetermined angle. Thus, using the above example of frequency and pulse repetition rate, the thyratrons will conduct for three half cycles and cease conduction for three half cycles to activate the electromagnet so as to pull the armature 51 to the left ten times per second. Shaft 57 will be rotated at one revolution per second, assuming that each activation of the electromagnet actuating winding rotates the shaft through 36°.

The duration of the timed-out interval can be controlled by inserting a switch at any of a number of locations in the circuit. For example, a switch may be inserted between differentiator 53 and blocking oscillator 41. The timed interval will be the period during which the switch is closed.

The invention is not necessarily to be restricted to the specific structural details, circuit connections, or arrangement of parts herein set forth, as various modifications thereof may be effected without departing from the spirit and scope of the invention.

The objects and features of the invention having been completely described, what we wish to claim is:

1. In combination:
   an electromagnet including an actuating winding;
   a mechanical counter connected to said electromagnet, said counter including a shaft for incrementally rotating a decimal wheel responsive to each energization of said electromagnet;
   first and second electric terminal means for connection to an alternating current source;
   multivibrator means having an output circuit; adapted to produce a rectangular wave output voltage in said output circuit;
   circuit means connected to said electric terminal means and to said multivibrator means for adjusting the repetition rate of said output voltage to a submultiple of the frequency of the alternating current source to be coupled to said terminal means;
   first and second thyratron means each including a plate electrode, a cathode, and a control grid, the plate electrode of each of said thyratron means being connected to the cathode of the other of said thyratron means;
   said multivibrator means being connected to the control electrodes of said first and second thyratron means to simultaneously bias said thyratron means above plate current cutoff at a predetermined low cathode-plate voltage on alternate half cycles of the output voltage of said multivibrator means; and
   second circuit means connecting said actuating winding between said terminal means in series circuit relationship with the cathode-plate current conduction paths of said thyratron means.

2. In combination:
   an electromagnet including an actuating winding;
   a mechanical counter connected to said electromagnet, said counter including a shaft for incrementally rotating a decimal wheel responsive to each energization of said electromagnet;
   an alternating current source;
   first circuit means including bistable multivibrator means, adapted to produce a rectangular wave output voltage, said circuit means being connected to said alternating current source and including means for adjusting the repetition rate of said output voltage at a submultiple of the frequency of the alternating current source to be coupled to said terminal means;
   first and second thyratron means each including a plate electrode, a cathode, and a control grid, the plate electrode of each of said thyratron means being connected to the cathode of the other of said thyratron means;
   said first circuit means being connected to said control electrodes means to simultaneously bias said thyratron means above plate current cutoff of a predetermined low cathode-plate voltage on alternate half cycles of the output voltage of said multivibrator means; and
   second circuit means connecting said alternating current source and said actuating winding in series circuit relationship across the cathode and plate electrodes of said thyratron means.

No references cited.

MALCOLM A. MORRISON, *Primary Examiner.*